United States Patent
Clemens

(10) Patent No.: US 6,833,863 B1
(45) Date of Patent: *Dec. 21, 2004

(54) METHOD AND APPARATUS FOR STILL IMAGE CAPTURE DURING VIDEO STREAMING OPERATIONS OF A TETHERED DIGITAL CAMERA

(75) Inventor: Bruce P. Clemens, Phoenix, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1241 days.

(21) Appl. No.: 09/019,965

(22) Filed: Feb. 6, 1998

(51) Int. Cl.[7] ........................ H04N 5/225; H04N 5/232; H04N 5/76

(52) U.S. Cl. ................ 348/220.1; 348/211.1; 348/231.2; 395/200.58

(58) Field of Search ................. 348/211, 552, 348/15, 220, 231, 232, 233, 211.99, 211.1, 14.05, 14.08, 14.09, 220.1, 231.99, 231.2, 231.3; 386/120; 395/200.58

(56) References Cited

U.S. PATENT DOCUMENTS

| | | | | |
|---|---|---|---|---|
| 5,382,974 A | * | 1/1995 | Soeda et al. | 348/221 |
| 5,402,170 A | * | 3/1995 | Parulski et al. | 348/211 |
| 5,598,351 A | * | 1/1997 | Chater et al. | 364/514 |
| 5,659,654 A | * | 8/1997 | Nagasawa et al. | 386/120 |
| 5,745,161 A | * | 4/1998 | Ito | 348/15 |
| 5,841,471 A | * | 11/1998 | Endsley et al. | 348/231 |
| 5,859,979 A | * | 1/1999 | Tung et al. | 395/200.58 |
| 5,986,698 A | * | 11/1999 | Nobuoka | 348/220 |
| 6,005,613 A | * | 12/1999 | Endsley et al. | 348/231 |

* cited by examiner

Primary Examiner—Wendy R. Garber
Assistant Examiner—Jacqueline Wilson
(74) Attorney, Agent, or Firm—Steven P. Skabrat

(57) ABSTRACT

Dual still image and video mode features are provided for a digital camera whereby the digital camera and an associated computer system support the concurrent capture of still images and video streaming operations. Capture and retrieval of a still image during video streaming operations of a digital camera tethered to a computer system includes pausing video streaming operations, capturing a still image by the digital camera, transferring the still image from the digital camera to the computer system, and resuming video streaming operations. Transfer of the captured still image is performed by camera device driver and bus interface software executing on the computer system. In one embodiment the digital camera is tethered to the computer system by a Universal Serial Bus (USB) and the camera device driver and bus interface software control access and usage of the USB.

16 Claims, 8 Drawing Sheets

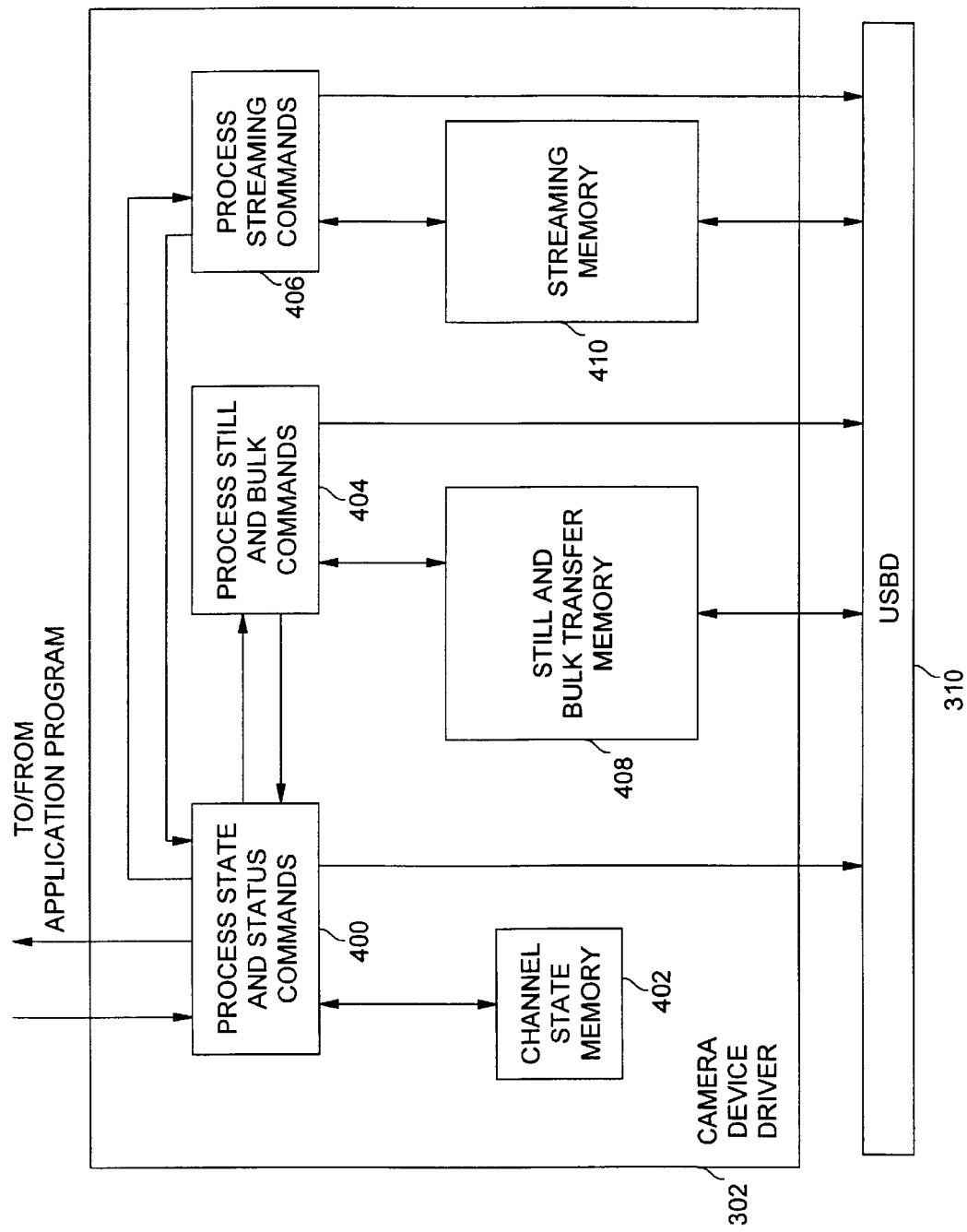

METHOD AND APPARATUS FOR STILL IMAGE CAPTURE DURING VIDEO STREAMING OPERATIONS OF A TETHERED DIGITAL CAMERA

BACKGROUND OF THE INVENTION

1. Field of the Invention

The present invention relates generally to digital cameras and computer systems and more specifically to the operational capabilities of a digital camera tethered to a computer system.

2. Description of Relater Art

The digital camera has recently been developed as a portable system that acquires and stores digital still images in electronic form. The images may be used in a number of different ways, such as being displayed in an "electronic" photo album or used to embellish graphical computer applications. The digital camera has a user interface much like a conventional chemical film camera, but the images are captured and stored entirely using electronic solid state circuitry and image processing techniques.

A typical digital camera has an electronic image sensor that receives incident light reflected from an object or scene through an optical interface. The optical interface may include a lens system, an aperture mechanism, and perhaps a light filter. The sensor can typically be implemented as an array of charge coupled device (CCD) or complimentary metal oxide semiconductor (CMOS) photo-detecting circuits that create light-generated signals in response to the incident light. Analog signals from the sensor are converted into digital format by an analog-to-digital (A/D) converter and are then further processed by logic circuitry and/or a programmed processor to yield a captured digital image of the object or scene. The captured image is temporarily stored in internal random access memory (RAM) and may then also be stored in a removable local memory aboard the camera. The internal RAM stores a single image but the removable local memory may store a number of images. In addition, images may be transferred to a computer that is linked to the digital camera for storage as electronic files, for display to a user, for further graphical and image processing to improve the image quality, and for use with other graphics software.

Most purchasers of digital cameras have access to a personal computer (PC) system for viewing the still images. Therefore, such purchasers might also enjoy using their digital camera to communicate with another person, such as in a videoconferencing application with another computer in order to both see and hear the other person. However, most digital cameras are typically configured to provide only still images. Similarly, cameras used for videoconferencing typically do not operate as a still camera when disconnected from the computer. In response to these limitations, a digital camera and associated image processing architecture have been developed that permits "dual mode" use of the camera for both video, where the camera may be linked ("tethered") to a computer for video purposes, and operated portably for still image capture. Such a system operates to provide still and video images through the same signal processing system, thereby reducing the cost to the consumer of purchasing separate still and video cameras.

However, such dual mode cameras have an inherent limitation in that the still image capture mode is used only when the camera is being operated in a portable, non-video manner. When the camera is used in the video mode (such as when it is connected to a PC for videoconferencing), the series of captured images comprising the video frame sequence overwrite any temporal still image which might be captured in the camera and stored in its internal RAM, thereby rendering impossible concurrent video streaming and still image capture operations.

Thus, a method and apparatus for providing concurrent video streaming and still image capture operations in a digital camera tethered to a computer is desired that overcomes the deficiencies and limitations of the prior art without adding to the cost of the camera.

SUMMARY OF THE INVENTION

An embodiment of the present invention is a method of capturing a still image during video streaming operations of a digital camera tethered to a computer system. The method includes the steps of pausing video streaming operations, capturing a still image by the digital camera, transferring the still image from the digital camera to the computer system, and resuming video streaming operations.

Another embodiment of the present invention is an apparatus for capturing a still image during video streaming operations of a digital camera. In a system having a digital camera tethered to a computer system by a bus, the apparatus includes a camera device driver executing on the computer system to pause video streaming operations, to request the capture of a still image by the digital camera, to request the transfer of the captured still image from the digital camera to the computer system, and to resume video streaming operations; and a bus interface driver coupled to the camera device driver and the bus to communicate commands and data between the camera device driver and the digital camera over the bus.

BRIEF DESCRIPTION OF THE DRAWINGS

The features and advantages of the present invention will become apparent from the following detailed description of the present invention in which:

FIG. 6 is a block diagram of a camera device driver; and

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention is a method and apparatus for providing true dual mode features for a digital camera whereby the digital camera and an associated computer system support the concurrent capture of still images and video streaming operations. Dual mode still image capture according to the present invention is likely to be used by anyone who is using the streaming video mode of operation to monitor the contents of a series of images displayed on a computer monitor while waiting for proper picture composition before issuing a capture still image command. For example, a professional photographer, photography hobbyist, or even a novice user can use the dual mode to take a picture with their digital camera while simultaneously filming video of a scene. In another example, cameras operating in video mode are sometimes used as security monitors. With the present invention, human operators can issue capture still image commands when interesting monitored events occur. Alternatively, real-time image analysis programs can automatically generate capture still image commands when scene composition recorded by the camera becomes interesting or fits modifiable preset parameters.

Figure 1:
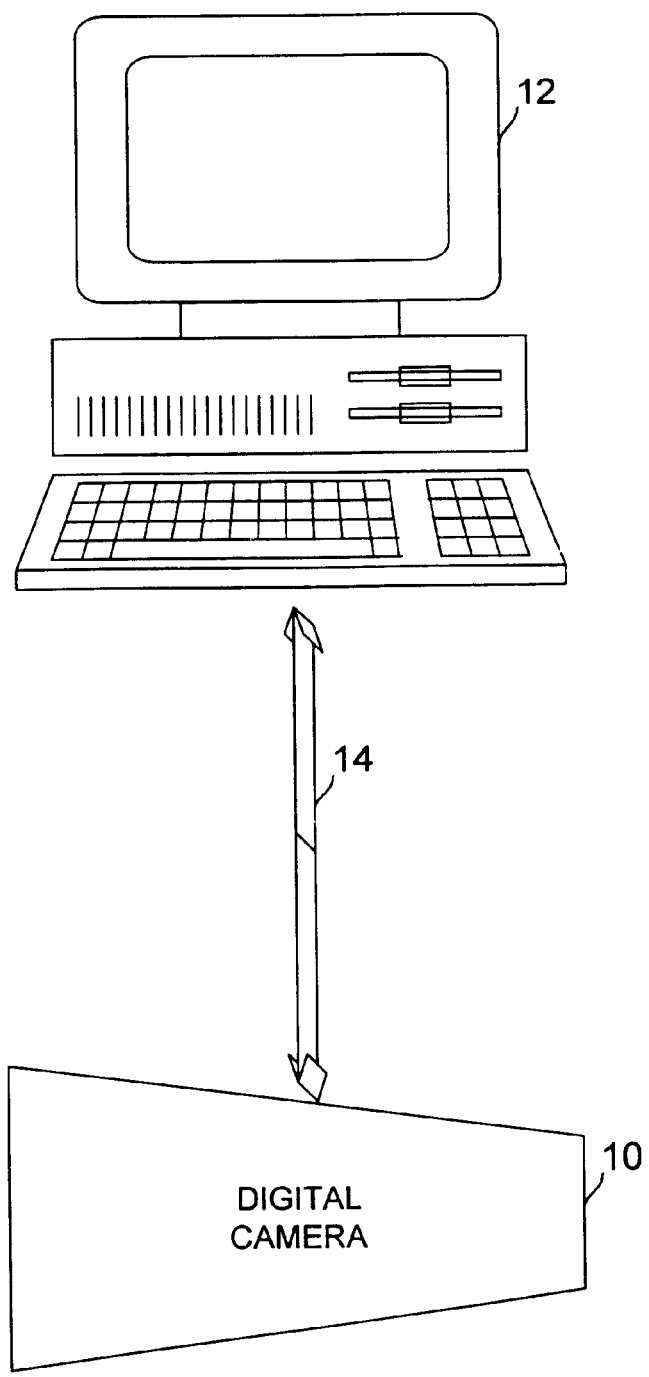
FIG. 1 is a diagram of the system environment of an embodiment of the present invention.

FIG. 1 is a diagram of the system environment of an embodiment of the present invention. A digital camera 10 is operated by a user (not shown) to capture still images and generate full motion video images. The digital camera is coupled to a host computer system 12 by a cable 14. The host computer system may be any general purpose computer system, including personal computers (PCs), workstations, and the like, all having at least one processing unit and at least one memory for storing machine readable instructions. In one embodiment, the system implements the Universal Serial Bus (USB) communications interface. The USB is a peripheral bus specification that brings "plug and play" of computer peripherals outside of the PC, eliminating the need to install printed circuit cards into dedicated computer slots and reconfigure the system when a new peripheral is added. Computers equipped with USB allow peripherals to be automatically configured as soon as they are physically attached. The USB is represented in FIG. 1 as cable 14. Alternatively, other communications interfaces between a computer system and computer peripherals may be used.

Figure 2:
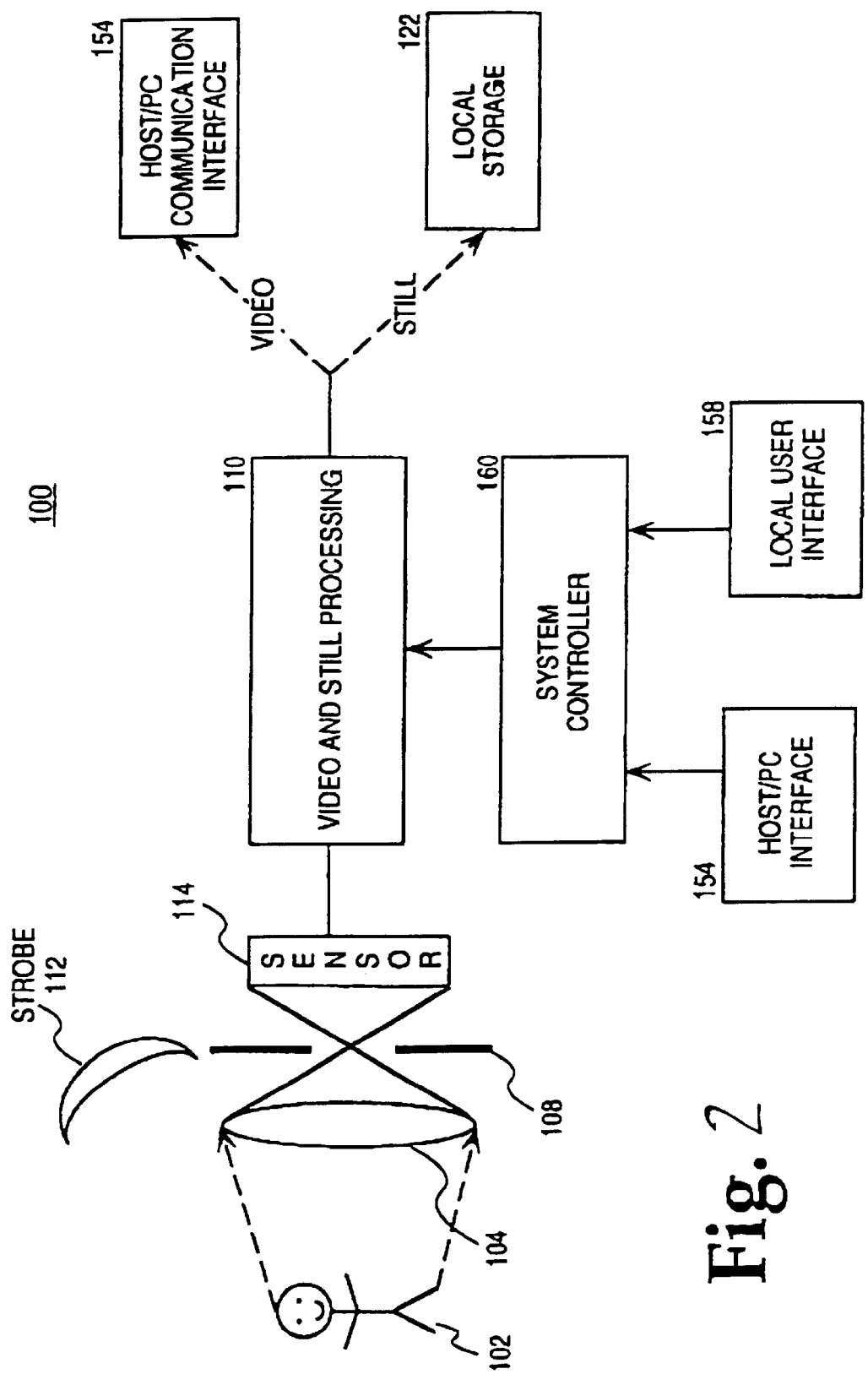
FIG. 2 is a logical block diagram of a digital image capture apparatus such as a digital camera.

FIG. 2 is a logical block diagram of a digital image capture apparatus such as a digital camera. Digital camera 100 operates in at least two modes of operation to provide still and video images through the same signal processing system. In one embodiment, the signal processing system provides video and still data from the same detailed, original image sensor signals by performing digital image processing operations in a chain fashion. The original image sensor signals are digitized and prepared to be spatially scaled, and then decorrelated and encoded into compressed data. The different image processing operations are implemented in reprogrammable logic circuitry accessible through a computer bus such as the USB, or alternatively by programming a high performance data processor to execute the operations in software.

The digital camera 100 includes a video and still processing block 110, an optical interface having a lens system 104 and an aperture 108 for being exposed to incident light reflected from an object 102 whose image is to be captured. The camera 100 may also include a strobe or electronic flash for generating supplemental light to further illuminate the object 102 when the camera 100 is operating under low light conditions.

The lens system 104 preferably has a fixed focal length which may be acceptable for both video and still operation, because a drop in the modulation transfer function (MTF) of the optical interface (and thus a degradation in image quality) for objects at close ranges (such as a user's face during videoconferencing) may be tolerated in video mode. The optical interface has an aperture mechanism 108 to control the dose of light on the sensor and the depth of focus, and may be configured for both video and still operation with only two settings as described below.

The optical interface channels the incident light onto an electronic image sensor 114. The image sensor 114 has a number of pixels which are electrically responsive to incident light intensity and color. The sensor 114 generates signals that will represent a captured image having sufficient resolution to be acceptable as a still image. An A/D converter (not shown) that receives light-generated analog sensor signals may be included in the sensor 114 and used to generate digital sensor signals that define a digital image of the exposed object 102 and the accompanying scene. Alternatively, the sensor 114 provides analog signals to the block 110 which in turn may perform analog signal processing on the signals before converting them to digital format. In either scenario, the digitized sensor signals thus define original image data which are then processed according to image processing methodologies by the video and still block 110 in order to form still images, or a sequence of video images depicting motion by the exposed object or scene, depending on whether the still or video mode of operation has been selected.

Mode selection can be made by the user of the apparatus 100 via mechanical controls (not shown) on the apparatus 100. Mechanical knob settings can be received and translated by a local user interface 158 into control signals and data to be processed by a system controller 160. The apparatus 100 can be tethered to a host computer, such as a PC, for video mode via a host/PC communication interface 154. This host/PC communication interface connects to cable 14 of FIG. 1. Video mode can be used only when the camera is tethered to the computer system. The user can then make the mode selection through software running on the host 12 of FIG. 1 which in turn communicates the proper control signals and data to the system controller 160 via the host/PC interface 154.

The system controller 160 orchestrates the capture of video and still images in response to the mode selection made by the user as outlined above. The system controller 160 configures the video and still processing block 110 to provide either still image data, or video image data depicting a sequence of video image frames. The images are then stored aboard the apparatus 100 and/or transferred to the host/PC for decompression (if the images had been compressed), rendering, and/or display.

The digital camera 100 includes a local storage device 122 which receives and stores the still image data. The storage device 122 may include a flash semiconductor memory and/or a rotating media device. The flash memory may be removable, such as the miniature card flash memory commercially available from Intel Corporation. The rotating media may also be removable or fixed, and may be of the magnetic disk or other type suitable for storing image data files.

The image data may also be transferred outside the camera 100 via the host/PC communication interface 154. The communication interface 154 can be configured to transfer both still and video image data to the host/PC according to a computer peripheral bus standard. The bus standards used can be, for example, the RS-232 serial interface, the Universal Serial Bus (USB), or the higher performance Institute of Electrical and Electronics Engineers (IEEE) Standard 1394–1995.

As mentioned above, the camera 100 is configurable both optically and electronically to operate in a number of modes, including video mode such as during videoconferencing, and still mode such as when taking pictures similar to using a conventional portable camera. From an optical standpoint, a fixed focal length lens system 104, such as one having 10 mm effective focal length, is preferred and can be used for both modes in order to reduce the cost of manufacturing the apparatus embodiment. In the video mode, used in videoconferencing and rapid frame rate applications to capture motion, an aperture 108 of about f/2 may be selected. The prime focus for this aperture setting is preferably at a distance of about 1 meter for the object 102 with depth of field extending to 2 meters for the background.

In the still mode of operation, acceptable quality still images of both outdoor and indoor scenes can be captured. For indoor scenes, the light level may be so low as to require supplemental light generated by a strobe or electronic flash 112. One would normally select an aperture 108 of between f/2 and f/8 for indoor scenes. Within this aperture range, the prime focus is at a distance of about 2 meters for the subject with depth of field extending to 4 meters for the background. For outdoor scenes with ambient light, the prime focus is preferably at a distance of about 2–3 meters for the subject with depth of field extending to infinity. Normally, one would select an aperture of about f/8 for outdoor scenes to accomplish that focus.

The camera 100 can also be electronically configured for dual mode operation by so configuring the video and still processing block 110 to provide either still image data or a sequence of video images. In one embodiment, the block 110 implements digital signal and image processing functions as logic circuitry and/or a programmed data processor to generate compressed image data having a predefined resolution and compression ratio from detailed, original image data received from the sensor 114. Such a block 110 is illustrated in FIG. 3 which is a logical block diagram of part of a digital camera (or other image capture apparatus) image processing system 200 according to an embodiment of the present invention.

Figure 3:
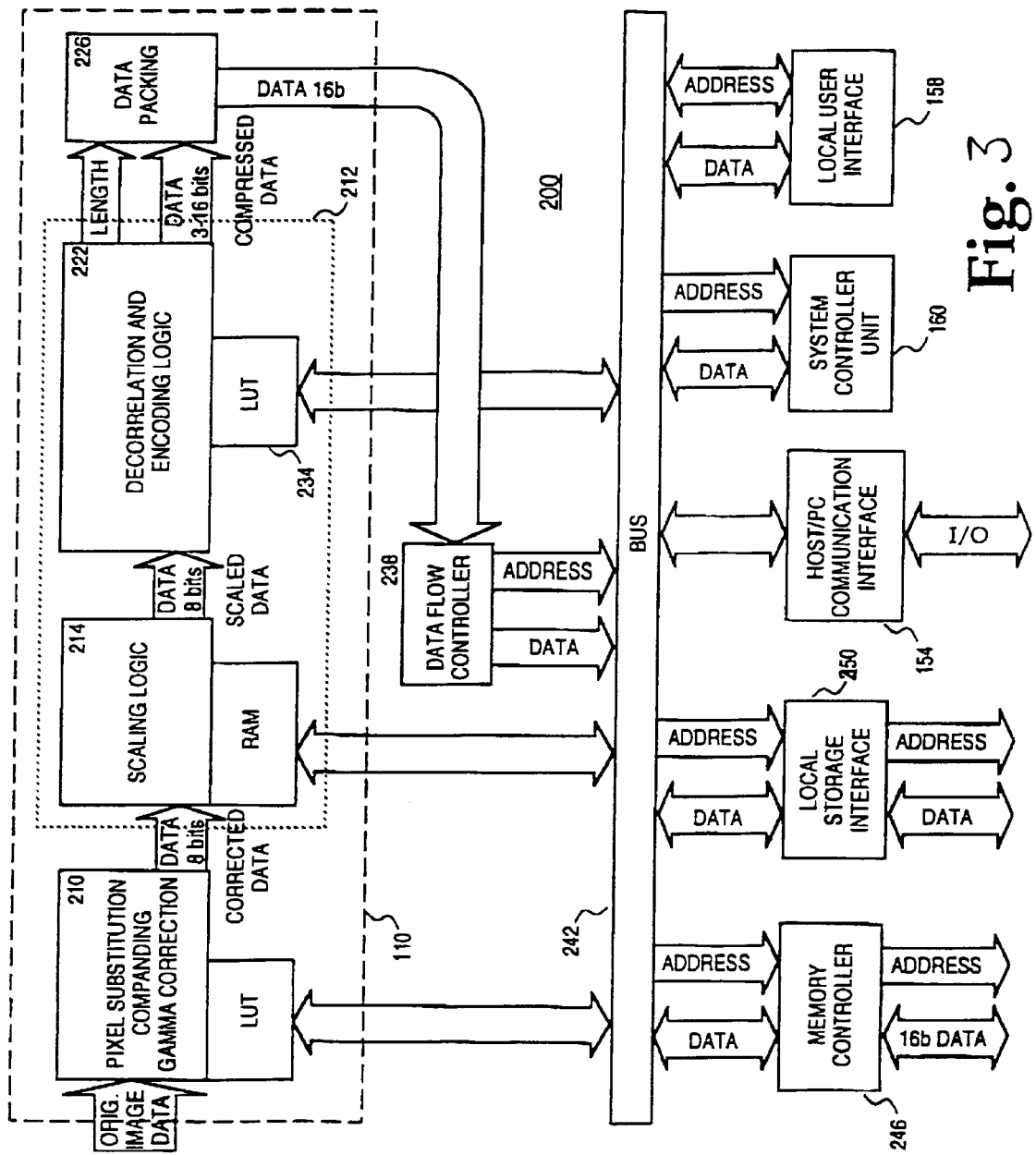
FIG. 3 illustrates an architecture of a digital camera image processing system according to an embodiment of the present invention.

FIG. 3 shows a data flow diagram for an embodiment of the invention of the path taken by image data for both video and still modes of operation. The processing block 110 includes a chain of imaging functions which may begin with a correction block 210. The correction block 210 is used whenever the quality of the original image data received from the sensor 114 warrants some sort of pre-processing before the image is scaled and compressed. In certain cases, the correction block 210 performs pixel substitution, companding, and gamma correction on the original image data received from the image sensor. The original image data should be of sufficient detail (e.g., 768×576 spatial resolution or higher is preferred) to yield still images of acceptable quality.

Pixel substitution may be performed in block 210 to replace invalid pixel data with valid data to provide a more deterministic input to subsequent imaging functions. Companding may be performed to lower the resolution of each pixel (the number of bits per pixel). For example, the original image data can arrive as 10 bits per pixel, whereas a preferred pixel resolution for the logic circuitry may be 8 bits (1 byte). Conventional gamma correction may also be performed to conform the information content of the image to that expected by the host computer where the image will be ultimately displayed.

Other functions that may be performed in block 210 on each received original image frame include fixed pattern noise reduction which is often needed before compressing an image. Once again, whether or not any correction functions are performed by block 210 in general depends on the quality of the original image data received from the sensor 114 and any subsequent image processing such as scaling or compression to be performed before the image data is ready for storage or transmission to the host computer.

Once the original image data has been corrected or otherwise processed into the desired size or format by correction block 210, the corrected data may be scaled and compressed if needed to meet the transmission and storage requirements of the host/PC communication interface 154 and the local storage device 122 as seen in FIG. 2. To meet such requirements, the processing block 110 can include scaling and compression logic 212 to perform any necessary image scaling and compression prior to transmission and/or storage.

For instance, the scaling and compression logic 212 may be configured to reduce image size and resolution to yield smaller, less detailed video images, as compared to larger and more detailed still images. Smaller and less detailed image data may be required in order to transmit a rapid sequence of video images that are to be decompressed and viewed in the host/PC. However, if the transmission link between the camera 100 and the host/PC has sufficient bandwidth to transmit a sequence of detailed original image data at the needed rate to the host/PC, then the scaling and compression logic 212 can be simplified or even eliminated for both still or video operation.

A number of digital image processing functions are contemplated for the compression logic 212 as shown in FIG. 3. These or others similar in function may be configured as described below by one skilled in the art depending on the performance (speed of rendering the compressed image data) and image quality desired from the system 200 given the optical interface used in the camera 100. The imaging functions have been implemented in one embodiment as separate units of logic circuitry as shown in FIG. 3 and which are described as follows.

The scaling logic 214 performs a 2-D spatial scaling of the corrected image data in order to yield smaller images that may be easier to store or transmit. The scaling is done according to a selected scaling ratio using conventional known techniques. The scaling ratio may be integer or fractional. The scaling can be performed in a 2-dimensional fashion by, for instance, utilizing two separate 1-dimensional scaling processes.

The scaling logic 214 can be used for both video and still image capture simply by selecting the appropriate scaling ratio. For instance, a 4:1 sub-sampling of the corrected image may be performed in video mode so that 16 pixels from the corrected image data are averaged together to produce one pixel in the scaled image data. Based on standard sampling theory, and assuming uncorrelated noise sources, the sub-sampling may also improve the signal to noise ratio by a factor of four. Lower scaling ratios such as 2:1 may also be used, where four pixels are averaged to generate a single pixel in the scaled image data, resulting in a signal to noise ratio (SNR) improvement of two. By scaling the more detailed corrected image data in this way during operation in video mode, the system 200 compensates for the increased noise due to lower light levels that are typically encountered with video operation, such as during videoconferencing.

Next in the chain of imaging function blocks in FIG. 3 is the decorrelation and encoding logic 222. The scaled image data received from the scaling logic 214 is decorrelated in preparation for entropy encoding which is a type of image compression, according to a selected one of a number of decorrelation methodologies. Once again, the user may select a particular decorrelation methodology that is suitable for obtaining the normally smaller size video images.

The decorrelation function can generate error image data as differences between neighboring pixels. One particular method that can be used for image decorrelation is digital pulse code modulation (DPCM). To obtain more compression of the image data, if needed, for example, in transmitting a large number of video image frames, "loss" may be introduced in the form of "quantization" (mapping a first set of data to a smaller set of values) errors using DPCM.

The next stage in the chain of imaging function blocks is entropy encoding performed by block 222, which uses a variable length encoding technique to compress the decorrelated image data. For instance, a commonly known entropy encoding methodology that may be used is Huffman encoding. Entropy encoding involves replacing symbols in the decorrelated image data by bit strings in such a way that different symbols are represented by binary strings of different variable lengths, with the most commonly occurring symbols being represented by the shortest binary strings. The entropy encoding logic 222 thus provides compressed image data, for instance as seen in FIG. 3, where the scaled 8-bit data is encoded into data having variable size of 3–16 bits.

Once again, the encoding methodologies for obtaining video and still images can be different and may be selected depending on the mode of operation. For instance, a larger set of symbols (having variable binary string lengths) may be used for encoding still image data as compared to video image data. This is because there may be more time allocated in the host/PC to decompress still images than to decompress video images. In contrast, for encoding video images, a more limited set of symbols having uniform binary string lengths should be employed to obtain faster decompression of a series of video image frames. In addition, having a uniform binary string length allows usage of a fixed amount of bandwidth to transmit the image data that is specifically suitable for a host/PC interface such as the USB.

The image processing system 200 includes additional logic that facilitates the dual mode operation described above. In particular, the logic circuitry in blocks 210 and 212 use programmable look-up tables (LUTs) and random access memories (RAMs) for flexibility in performing their respective imaging functions. Each LUT or RAM provides information to its respective imaging function logic as specified by the selected methodology for the particular mode of operation. For instance, the scaling logic 214 uses a RAM storage area to store intermediate scaling computations. Also, the LUT 234 for the decorrelation and encoding logic can be loaded with different rules and data required for performing decorrelation and encoding as known in the art, depending on whether a still or a video image is desired. In a particular embodiment, two look-up tables (LUTs) are used for LUT 234, one for listing the characters (a so-called "code book") and one for listing the string lengths.

Different techniques may be used to determine the proper values to be loaded into the RAM and LUTs. For instance, image metering may be performed by the camera controller unit 160 to determine lighting and other factors which impact decorrelation and entropy encoding. Also, as mentioned earlier, transmission and storage constraints may dictate greater compression, especially during video operation where a large number of image frames are generated, so that the LUTs for decorrelation and entropy encoding will include a smaller code book for compression of the image data.

Although the different LUTs and RAM described above may be implemented as part of a single, physical RAM unit or alternatively may be combined in different combinations as one or more RAM units, each LUT and RAM is preferably implemented in a physically separate unit to obtain faster performance of the imaging functions.

After the image data has been compressed according to the desired mode by the compression logic 212, the now variable size data is then passed to the data packing unit 226 where the data is packed into constant size, and therefore more manageable, data segments for more efficient storage and transmission over a computer bus. Once again, if the image data from the sensor 114 is sufficiently acceptable as is, and there are no further transmission or storage constraints on such data, then the data packing unit becomes superfluous, since the sensor image data has a constant size and can be easily stored or transferred outside the apparatus 100 with minimal processing.

In the data packing unit 226, received data blocks of different size are packed into blocks having a predefined, constant size. For example, the system 200 in FIG. 3, the data packing unit packs the variable size compressed image data into 16-bit blocks. The 16-bit blocks are then forwarded to a data flow controller 238 such as a Direct Memory Access (DMA) controller, which then adds address information to each data block before accessing a bus 242 in order to forward the 16-bit blocks onto the bus. The memory controller 246 accepts the 16-bit blocks over the bus 242 and stores them temporarily in memory such as dynamic RAM (DRAM) (not shown) aboard the camera 100.

After being packed, the still image data may then be transferred over the bus 242 to the local storage 122 (see FIG. 2) via a local storage interface 250 coupled to the bus 242. For instance, the local storage device 122 may be a removable flash memory card which receives the image data prepared as a "file", including compression tables, file headers, time and date stamps, and metering information attached to the image data. The card may then be removed from the camera 100 and inserted into a PC 12 to transfer the still image data for decompression, viewing and/or further processing in the PC.

As an alternative to using a removable storage device, the host/PC communication controller 154 may be used to transfer both the still and video images outside the camera 100. This may be accomplished by preparing the still image data as a disk file appropriate for transmission using the particular bus standard used in the communication interface 154, to be transferred to the host computer 12 for storage and access by a host processor (not shown). The video image data can be streamed according to known techniques to the host computer via a controller interface such as USB.

The dual mode operation of the camera 100 and processing system 200 has been described in the context of a bus-based architecture shown in FIG. 3. To further facilitate software control of the different modes of operation in this architecture, a number of memory-mapped control registers (not shown) may be coupled to the bus 242 to allow the system controller 160 to configure the camera 100 and the system 200 with the desired mode of operation. Instructions can be provided for execution by the system controller to access the LUTs, RAM, and control registers via the bus 242 in order to program the parameters needed for the proper image processing methodologies of the selected mode of operation. For instance, the different rules and parameters for scaling, decorrelation, and entropy encoding methodologies for all modes of operation may be stored as controller instructions aboard the camera 100 during manufacture, where each mode of operation is assigned a different set of methodologies. The appropriate set can be loaded into the video and still block 110 in response to a mode selection by the user, made through either the local user interface 158 or the host/PC communication interface 154.

Figure 4:
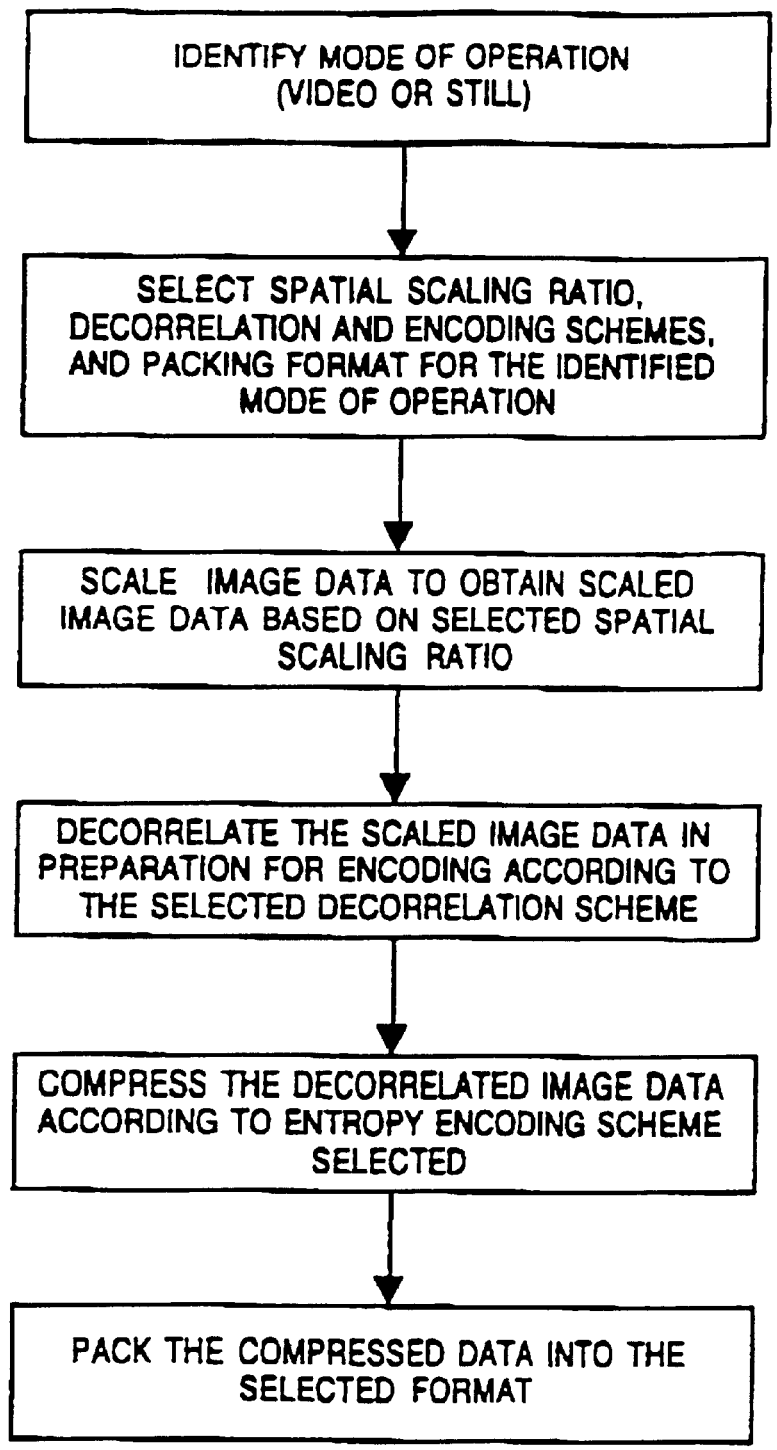
FIG. 4 is a logical flow diagram of signal processing steps performed according to an embodiment of the present invention.

Although one embodiment of the video and still block 110 is as logic circuitry, the image processing system 200 may also be equipped with a programmed high performance processor executing instructions to perform the digital imaging functions of the block 110. Exemplary steps that may be performed by such a processor are illustrated in FIG. 4, and can be easily understood based on the description above of the correction block 210 and the compression logic 212 in the video and still processing block 110 embodiment in FIG. 3. The sequence of steps in FIG. 4 may be performed by the system controller 160, or by a separate, dedicated processor (not shown) that is also coupled to the bus 242.

To summarize the description of the camera, the above described embodiments may be used in an apparatus such as a digital camera that operates in both still mode (for capturing still images when portable or tethered) and in video mode (where the digital camera is tethered via a computer peripheral bus interface to a host computer or other image viewing system). The camera has an image sensor and a video and still processing block 110 that is configured to capture detailed images in still mode, in both outdoor and indoor scenes. In video mode, the camera may be configured to compress a sequence of the detailed images (if needed for transmission and storage) using the same processing block 110 in order to capture a video sequence that can be transmitted to the host computer for viewing via a computer peripheral bus interface such as the USB.

The embodiments of the digital camera described above are, of course, subject to some variations in structure and implementation. For instance, although the image data path in the processing block 110 is shown as being 8 bits wide initially and up to 16 bits when compressed, one skilled in the art will recognize that the invention can be implemented using other data path widths. Also, the system controller 160 may be combined with the data flow controller 238 into one physical, integrated circuit unit such as a microcontroller.

Figure 5:
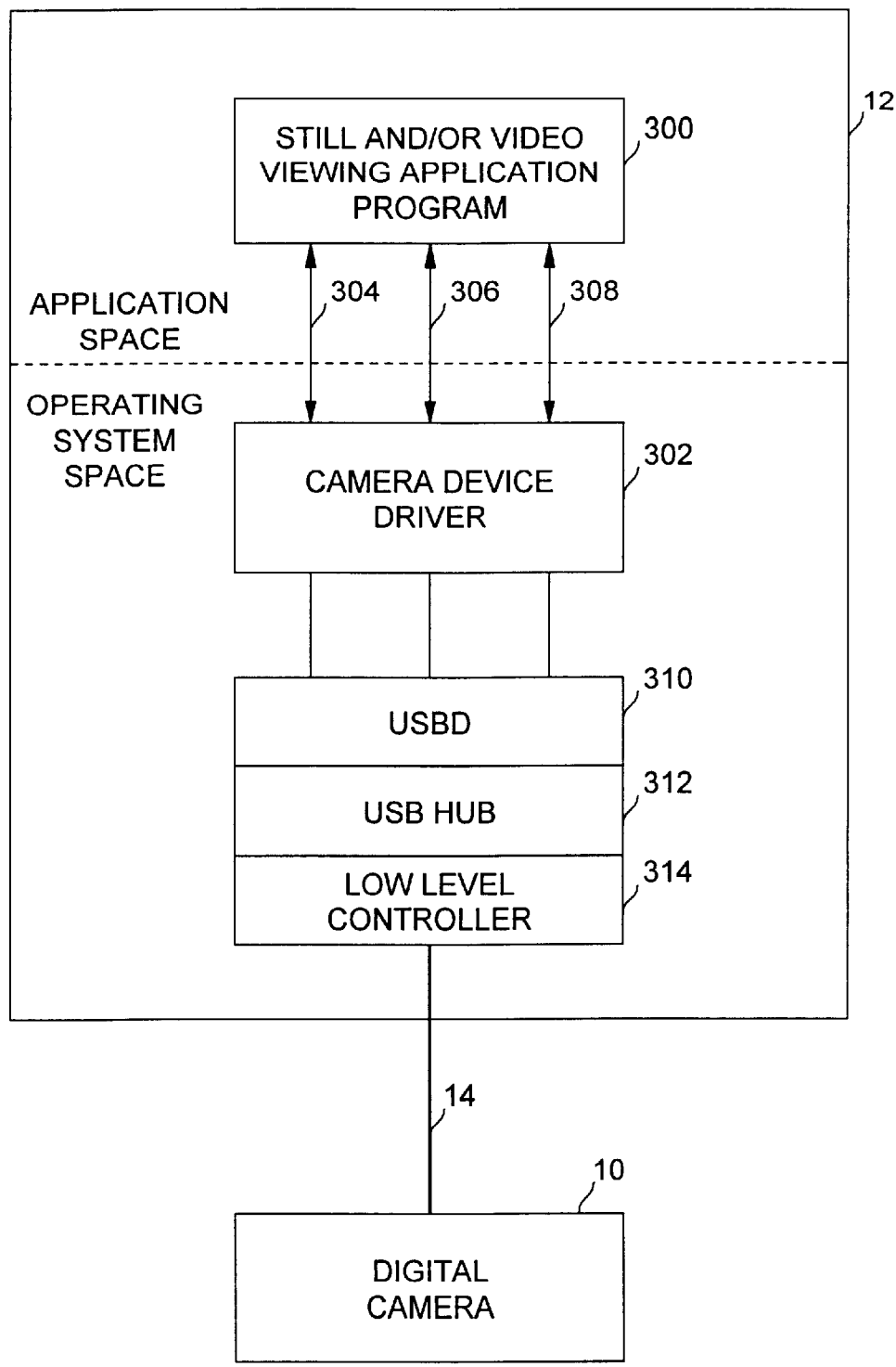
FIG. 5 is a block diagram of the host computer system-based components interacting with the digital camera.

FIG. 5 is a block diagram of the host computer system-based components interacting with the digital camera. Digital camera 10 is coupled to the computer system 12 by a bus interface 14. In one embodiment, the interface is the USB. An application program for viewing a still image and/or full motion video 300 is executed by the computer in application space. The application program may be used for image display and manipulation, videoconferencing, and other functions relating to captured images and video streams. The application program 300 interfaces to camera device driver software 302 in order to communicate with the digital camera 10. Camera device driver software is executed by the computer system in operating system space. The interface between the application program and the camera device driver software is shown by lines 304, 306, and 308 on FIG. 5. Interface 304 represents the commands and status messages passed between the two components, interface 306 represents the transfer of still images and bulk data (such as camera initialization look-up tables (LUTs)), and interface 308 represents the transfer of video images.

Camera device driver software 302 provides the interface between application programs executing on the PC and the digital camera. The driver coordinates communications with the USB cable 14 through interaction with a bus interface driver called the USB driver (USBD) 310. The USBD is a low-level routine for coordinating packets for all USB device drivers for the computer system. The USBD takes command packets from the camera device driver and converts them into electrical signals sent over USB Hub 312. The USB Hub 312 connects to I/O ports of low level controller 314, which connects to the USB cable 14. In one embodiment, the low level controller is a PIIX controller commercially available from Intel Corporation.

When the digital camera is tethered to the computer as shown in FIG. 5, an image captured by the camera is stored in internal RAM until a request is received by the camera to transfer the captured image to the computer. There are three commands communicated over interface 304 relating to the capture and transmission of still images. The first command is the capture image command. The still and/or video viewing application program 300 sends this command to the digital camera to instruct the camera to open the camera's sensor, expose the image, and copy the exposed image to the internal RAM in the camera. The second command is the request size of image command. The still and/or video viewing application program 300 sends this command to the digital camera to obtain the size in bytes of the captured still image. The application program then allocates a portion of memory on the host computer system to hold the still image. The third command is the request to send the image command. The still and/or video viewing application program sends this command to the digital camera to cause it to transfer or upload the captured image to the computer system. This command includes the image size in terms of number of bytes that was received in response to the request size of image command. When the operating mode is video, the captured images are transferred back to the still and/or video viewing application program over interface 308. When the operating mode is still, the captured image is transferred back to the still and/or video application program over interface 306.

In prior art systems, when a command was sent to the camera for initiating image capture, the camera captured the image and stored it in the camera's internal RAM. At a subsequent time, the application program requested an upload of the captured image from the camera to the PC. In still mode, this method works until such time as the image in the internal RAM is overwritten. However, during video streaming operations, the captured still image is overwritten almost immediately by the next video frame captured by the camera since there is only room in the internal RAM on the camera to store a single image. An embodiment of the present invention overcomes this problem in the following manner. At any time that the camera device driver 302 detects a capture image command from the still and/or video viewing application program 300, the camera device driver performs the entire image capture and image retrieval command sequence as an atomic operation, thereby causing the captured image to be stored on the host computer system before it can be overwritten by the next video frame in the video streaming sequence generated by the camera. This atomic operation cannot be interrupted by events relating to the video streaming processing, thus ensuring that the captured image will be retained on the host. This processing is performed on demand at any time the camera is tethered to the host system, effectively making true dual mode processing work. Users can then take still images during a video streaming processing such as a video conference.

Whereas still images are transferred with the capture image/request size of image/request to send image command sequence, streaming video images are transferred via a significantly different command sequence. First, the camera device driver sends a command to the digital camera that sets the amount of video data to be transferred on each video transfer request. The amount selected is typically between 64 and 768 bytes of data for each packet of video data that the camera sends to the computer system. In one embodiment, the image is 320 pixels wide by 240 pixels high, resulting in 76,800 bytes for a single video frame. Hence, one hundred 768-byte packets of video data are required to make up a complete video frame. The camera device driver sends a get more video data command one hundred times to get a single video frame if the packet size if 768 bytes. The camera device driver sends a start streaming video data command to the camera. The camera device driver then enters a loop, performing the operations of sending a get more video data command to the camera, appending a packet of video data to a video data frame buffer on the host, getting the video data until a complete video frame is received, performing video decompression and enhancement on the video frame, and sending the processed video frame to the application program. In video mode, only one capture command is sent (the start streaming command), only one size command is sent (the one that sets the size of the individual packets of video data), and each frame of video data requires many get data requests. A set video data packet size command and the start streaming command are only sent when video mode is to be started. After they are sent, the video data keep streaming from the camera, as long as the camera device driver continues to send get more video data commands.

FIG. 6 is a block diagram of the camera device driver of an embodiment of the present invention. The camera device driver accepts commands and returns status and data to the application program, and also interacts with the USBD 310 for communication with the digital camera. Process state and status commands function 400 accepts commands from the application program to request the digital camera to perform a function and returns the status of that request to the application program. Process state and status commands function 400 interrogates channel state memory 402 for the current status of camera device driver and digital camera operation.

If the received command relates to still image capture and retrieval or bulk data downloads during camera initialization, the process state and status commands function 400 directs process still and bulk commands function 404 to handle the command. If the received command relates to video streaming, the process state and status commands function 400 directs process streaming commands function 406 to handle the command. In either case, the appropriate function 404 or 406 sends a command through the USBD to the camera. In response, image data is sent by the camera to the camera device driver via the USB. When a bulk transfer of data is taking place (for example, upon camera initialization when color look-up tables (LUTs) or other data is to be downloaded), the data is temporarily stored in still and bulk transfer memory 408 prior to transfer to the camera. When a still image is being retrieved from the camera, the image data is stored in still and bulk transfer memory 408 before transfer to the application program. When one of a series of video frames is being retrieved from the camera, the image data making up a video frame is stored in streaming memory 410 before transfer to the application program. Note that still image data and video data are stored in separate memory locations within the camera device driver on the host computer. Note also the parallel control paths for effecting still and video streaming operations as implemented by process still and bulk commands function 404 and process streaming commands 406.

For still image processing, the application program sends a capture image command to the process state and status commands function 400. This function directs process still and bulk commands function 404 to send the command to the camera and locks out future video streaming commands from being performed until the still image processing is complete. When the still image data is returned by the camera, it is loaded into still and bulk transfer memory 408 by the USBD 310. Upon receipt of a request from the application program, process still and bulk commands function 404 directs the transfer of the data to application program space and returns a status to process state and status commands function 400, which returns the same to the application program.

For video streaming processing, the application program sends video streaming commands to the process state and status commands function 400. This function directs processing streaming commands function 406 to send these commands to the camera. When a video frame is received from the camera, it is loaded into streaming memory 410 by the USBD 310. Process streaming commands function 406 then directs the transfer of the video frame data to the application program space for display to the user and returns a status to process state and status commands function 400, which may or may not return a status to the application program.

Figure 7A:
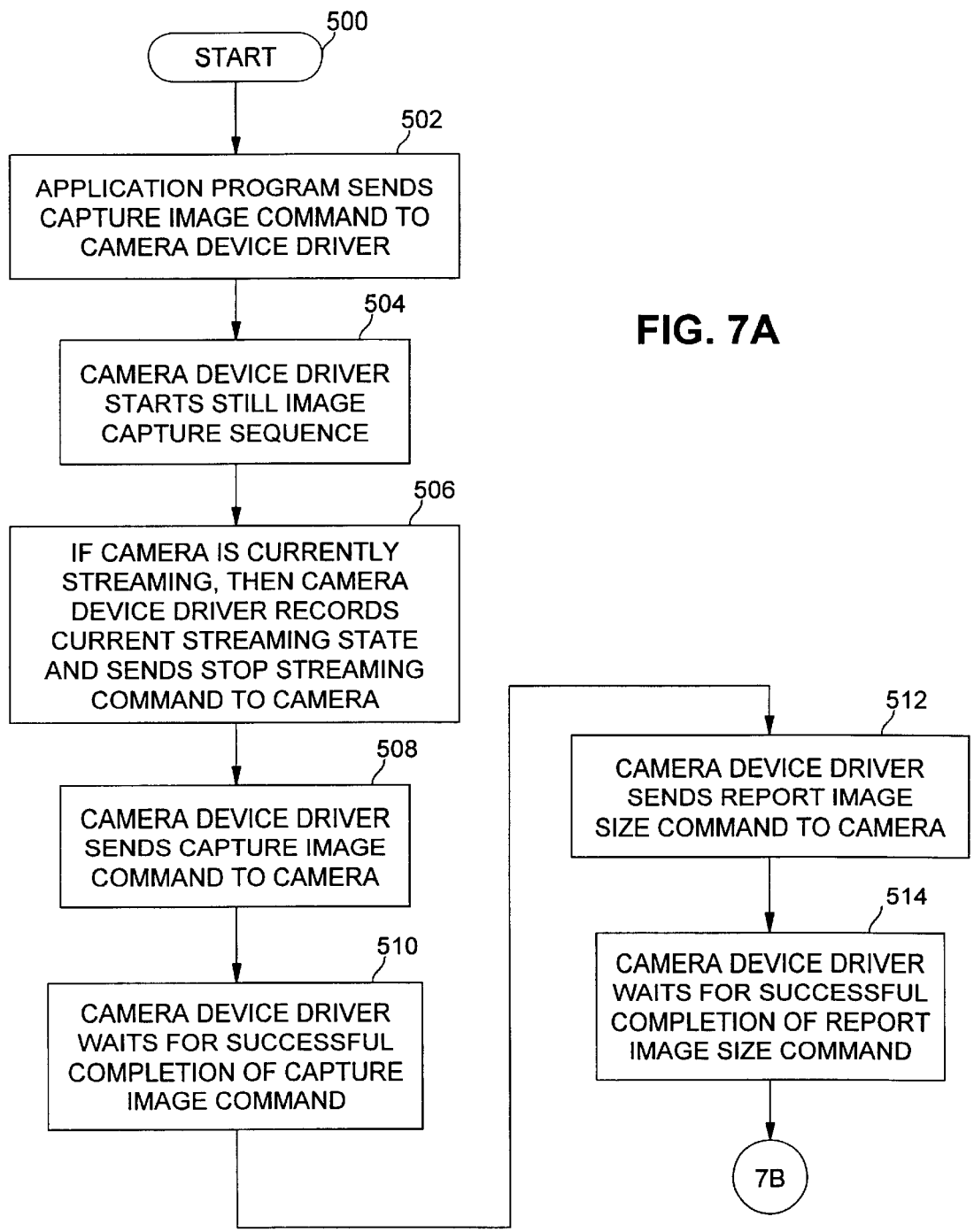
FIGS. 7A and 7B are flow diagrams of the steps for capturing and retrieving a still image from the digital camera.
Figure 7B:
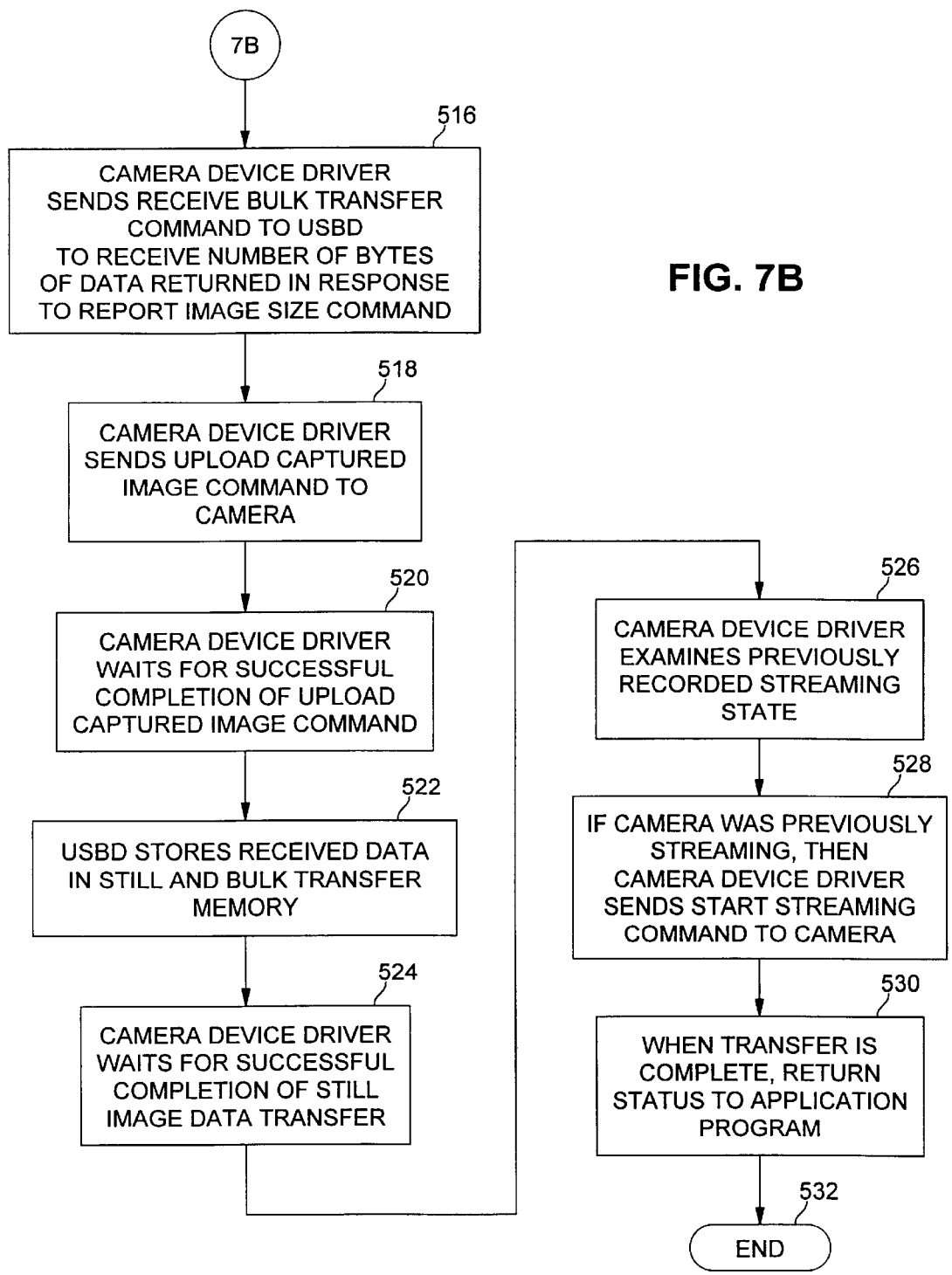

FIGS. 7A and 7B are flow diagrams of the steps for capturing and retrieving a still image from the digital camera according to an embodiment of the present invention. These steps are performed when the camera is tethered to the computer system in both still and video streaming modes of operation. The captured still image may be copied from the flash memory card or the camera's internal RAM. After start step 500, an application program sends a capture image command to the camera device driver at step 502, instructing the driver to cause the camera to take a picture. The driver examines the command and determines that it is a capture image request. The camera device driver then initiates the entire sequence of commands to completely capture and retrieve the image at step 504. First, the camera device driver determines if the camera is in the video streaming mode of operation. When the camera is in the video streaming mode, it continuously captures an image and makes the captured image available for uploading to the computer. If the camera is currently streaming, then the camera device driver records the current streaming state and sends a stop streaming command to the camera at step 506.

Once the current state is saved, the camera device driver sends a capture image command over the USB to the camera at step 508. The camera device driver waits for the successful completion of the capture image command at step 510. The driver returns an error to the application program if the command fails. If the command is successful, the image has been captured by the camera and is now stored in the camera's internal RAM. The camera device driver then sends a report image size command to the camera at step 512. This command is a request to get the size in bytes of the captured image. At step 514, the camera device driver waits for successful completion of the report image size command. If an error is reported, the camera device driver returns an error to the application program. Otherwise, processing continues on FIG. 7B via connector 7B.

Once the camera device driver knows how large the image is, it must prepare the USBD layer to retrieve a bulk transfer of the specified size. At step 516 on FIG. 7B, the camera device driver sends a receive bulk transfer command to the USBD to receive the number of bytes of image data returned in response to the report image size command. The received data will be stored in the driver's still and bulk transfer memory area. As a result of this command, the USBD is ready and waiting to receive any bulk data the camera sends across the USB. However, the camera will not begin sending the data until it receives an upload captured image command from the driver. The camera device driver sends the upload captured image command to the camera at step 518. The camera device driver waits for the successful completion of the command at step 520. If the command fails, then the receive bulk transfer command previously sent to the USBD layer is canceled and an error status is returned to the application program. If the command completes successfully, this only means that the camera has received the driver's request to upload the captured image. It does not mean that the upload has completed. The upload captured image command initiates the transfer of the captured image. At step 522, the USBD stores image data received from the camera over the USB into the flag-protected still and bulk transfer memory on the host computer system. At step 524, the camera device driver waits for the captured image to be completely sent and the successful completion of the upload captured image command. If an error occurs, then an error status is returned to the application program.

Before completing the capture image command, the camera device driver examines the previously recorded state of the camera at step 526. If the camera was previously streaming at step 528, then the camera device driver sends a start streaming command to the camera to resume video streaming operations. When the transfer is complete without error, a success status is returned to the application program at 530 and processing ends at end step 532. This completes processing of the capture image command. The camera can now resume its video streaming. The image is now available in flag-protected still and bulk transfer memory on the host computer system for use by the application program. The application program must now request that the captured image be copied to application program memory space. It will normally do this by requesting the captured image size, allocating memory to hold the image, and then requesting that the image be copied. Note that since the image has already been uploaded from the camera to the computer system, when the camera device driver receives the get size of captured image command from the application program, it does not need to send any commands to the camera. It simply returns the size that the camera had previously reported. Similarly, when the camera device driver receives the upload image command from the application program, it does not need to send any commands to the camera. It simply copies the image from the still and bulk transfer memory within the camera device driver space where it had been previously stored to the application program's memory space.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of operating an imaging system in a dual mode of operation by capturing a still image concurrently with performance of digital video streaming operations of a digital camera tethered to a computer system comprising:

pausing digital video streaming operations of the digital camera;

capturing a still image by the digital camera;

storing the still image as digital still image data in a memory within the digital camera;

transferring the digital still image data from the digital camera to the computer system;

storing the digital still image data in a first memory in the computer system and storing digital video streams in a second memory in the computer system; and resuming digital video streaming operations of the digital camera;

wherein the above steps are performed as an atomic operation which is non-interruptible.

2. The method of claim 1, wherein pausing digital video streaming operations by the digital camera comprises saving a current state of digital video streaming operations and sending a stop streaming command from the computer system to the digital camera.

3. The method of claim 2, wherein resuming digital video streaming operations comprises examining the saved current state of digital video streaming operations and sending a start streaming command from the computer system to the digital camera when the saved current state indicates video streaming.

4. The method of claim 1, wherein capturing the still image by the digital camera further comprises sending a capture image command from the computer system to the digital camera.

5. The method of claim 1, wherein transferring the digital still image data from the digital camera to the computer system comprises:

obtaining a size of the digital still image data from the digital camera;

requesting transfer of the digital still image data from the digital camera according to the size of the digital still image data;

receiving the digital still image data from the digital camera; and storing the digital still image data in memory in the computer system.

6. In a system for capturing a still image concurrently with digital video streaming operations of a digital camera tethered to a computer system, a machine readable medium having stored therein a plurality of machine readable instructions executable by a processor of the computer system, the machine readable instructions comprising instructions to cause the interruption of digital video streaming operations by the digital camera, to request the capture of a still image by the digital camera, to store the still image as digital still image data in a memory within the digital camera; to transfer the digital still image data from the digital camera to the computer system, to store the digital still image data in a first memory in the computer system and to store digital video streams in a second memory in the computer system, and to cause the resumption of video streaming operations by the digital camera, wherein the above steps are performed as an atomic operation which is non-interruptible.

7. The machine readable medium of claim 6, wherein the pausing digital video streaming operations machine readable instructions comprise instructions to save a current state of digital video streaming operations and to send a stop streaming command from the computer system to the digital camera.

8. The machine readable medium of claim 7, wherein the resuming digital video streaming operations instructions comprise instructions to examine the saved current state of digital video streaming operations and to send a start streaming command from the computer system to the digital camera when the saved current state indicates video streaming.

9. The machine readable medium of claim 6, wherein the machine readable instructions to capture the still image by the digital camera further comprise instructions to send a capture image command from the computer system to the digital camera.

10. The machine readable medium of claim 6, wherein the machine readable instructions to transfer the digital still image data from the digital camera to the computer system comprise instructions to obtain a size of the digital still image data from the digital camera, to request transfer of the digital still image data from the digital camera according to the size of the digital still image data, to receive the digital still image data from the digital camera, and to store the digital still image data in memory in the computer system.

11. In a system having a digital camera tethered to a computer system by a bus, an apparatus for operating in a dual mode of operation by directing the capture and retrieval of a still image concurrently with digital video streaming operations of the digital camera comprising:

a camera device driver executing on the computer system to pause digital video streaming operations of the digital camera, to request the capture of a still image by the digital camera, the captured still image being stored as digital still image data in a memory within the digital camera, to request the transfer of the digital still image data from the digital camera to the computer system, to store the digital still image data in a first memory in the computer system and to store digital video streams in a second memory in the computer system, and to resume digital video streaming operations of the digital camera, wherein the above functions are performed as an atomic operation which is non-interruptible; and a bus interface driver coupled to the camera device driver and the bus to communicate commands and data between the camera device driver and the digital camera over the bus.

12. The apparatus of claim 11, wherein the camera device driver comprises a first driver coupled to the bus interface driver and an application program executing on the computer system to process state and status commands received from the application program;

a second driver coupled to the first driver to process still image capture commands; and a third driver coupled to the first driver to process video streaming commands.

13. The apparatus of claim 12, wherein the camera device driver further comprises a first memory to store digital still image data received from the digital camera by the bus interface driver.

14. The apparatus of claim 12, wherein the camera device driver further comprises a second memory to store digital video frame data received from the digital camera by the bus interface driver.

15. In an imaging system having a digital camera tethered to a computer system by a bus, a method of operating the imaging system in a dual mode of operation by capturing a still image concurrently with performance of digital video streaming operations comprising:

sending a first command by an application program to a camera device driver to instruct the digital camera to capture a still image;

saving a digital video streaming state and sending a second command to the digital camera to instruct the digital camera to pause digital video streaming when a mode of operation is digital video streaming;

sending a third command to the digital camera to instruct the digital camera to capture a still image;

sending a fourth command to the digital camera to instruct the digital camera to transfer the captured still image to the computer system;

receiving the captured still image;

storing the captured still image in a first memory in the computer system and storing digital video streams in a second memory in the computer system; and sending a fifth command to the digital camera to instruct the digital camera to resume digital video streaming when the mode of operation is digital streaming;

wherein the above steps are performed as an atomic operation which is non-interruptible.

16. The method of claim 15, further comprising obtaining the size of the captured still image from the digital camera prior to receiving the captured still image.

* * * * *